Feb. 18, 1930.  O. E. LINCK  1,747,834

FERTILIZER SPRAYER

Filed Dec. 6, 1927

INVENTOR
Otto E. Linck
BY
Zoltan A. Polachek
ATTORNEY

Patented Feb. 18, 1930

1,747,834

UNITED STATES PATENT OFFICE

OTTO E. LINCK, OF UPPER MONTCLAIR, NEW JERSEY

FERTILIZER SPRAYER

Application filed December 6, 1927. Serial No. 238,068.

This invention relates generally to spraying devices, and has more particular reference to a liquid fertilizer distributer.

The invention has for an object the provision of a device of the class mentioned, which is of simple construction, desirable and efficient in action, and which can be manufactured and sold at a reasonable cost.

The device has a tubular body, a helical spring disposed within the body, and adjacent the inner sides thereof, and a fertilizer container arranged within the spring. The rear of the tubular member is provided with water inlet means, and the front with water outlet means. The rear of the fertilizer container is formed with several water inlet apertures and the front is open except for a screen which is clamped thereover. The sides of the container near the front are provided with water passage apertures. Means for adjusting the water inlet apertures in the rear of the container, may be supported by the container.

For further comprehension of the invention, and of the objects and advantages thereof, reference will be had to the following description and accompanying drawings, and to the appended claims in which the various novel features of the invention are more particularly set forth.

Referring to the accompanying drawing, forming a material part of this disclosure:—

Figure 1:
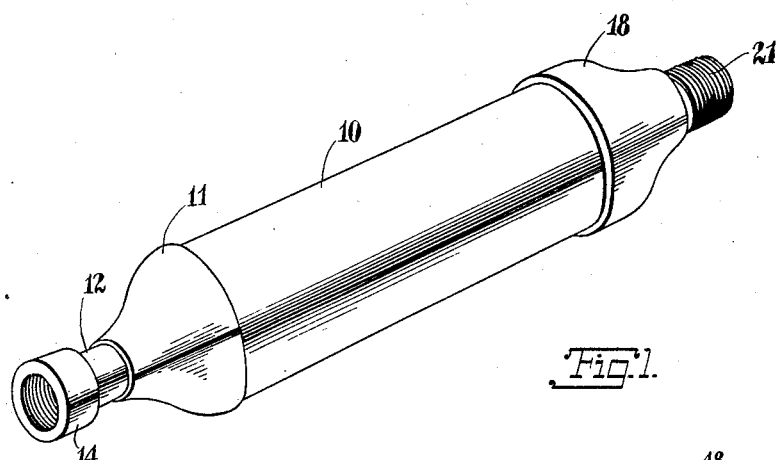
Fig. 1 is a perspective view of a device constructed according to this invention.
Figure 2:
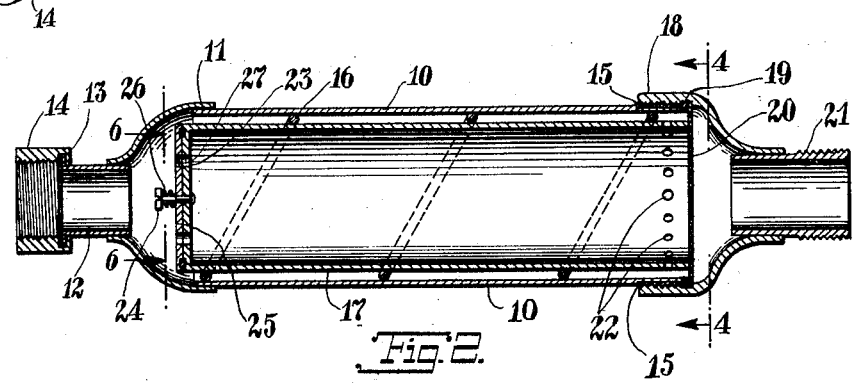
Fig. 2 is a longitudinal central vertical sectional view thereof.
Figure 3:
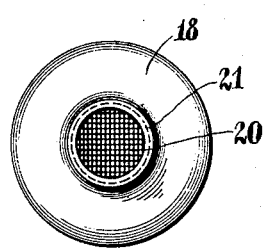
Fig. 3 is an end view, as seen from the right hand side of Fig. 2.
Figure 4:
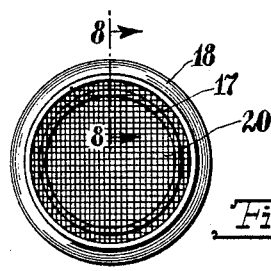
Fig. 4 is a vertical sectional view taken on the line 4—4 of Fig. 2.
Figure 7:
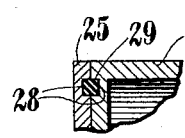
Fig. 7 is a fragmentary sectional view taken on the line 7—7 of Fig. 6.
Figure 6:
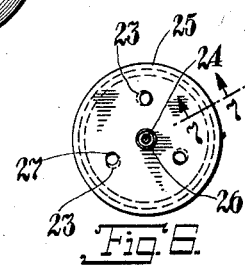
Fig. 6 is a vertical sectional view taken on the line 6—6 of Fig. 2.
Figure 8:
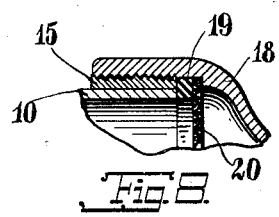
Fig. 8 is a fragmentary sectional view taken on the line 8—8 of Fig. 4.
Figure 5:
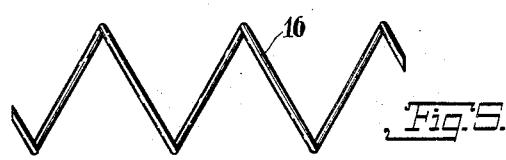
Fig. 5 is a side view of the helical spring used in the device.

The reference numeral 10 indicates generally a tubular body member having a tube reducer 11 attached at its rear end. A small tube 12 is attached to reducer 11 and has a flange 13 at its free end. A threaded coupling member 14 is engaged upon the flange 13 and the end of the tube 12, and is adapted to be connected to a water supply pipe to form the inlet connection of the device.

A threaded collar 15 is attached to the front end of the tubular member 10. A helical spring 16 of an outside diameter slightly greater than the inside diameter of the member 10 is forced into the member 10. A container 17 for holding a bag of fertilizer, is slipped within the spring 16 and is a sliding fit therein, the rear end of the container is closed and the front end open. A tube reducer 18 is threadedly engaged on the collar 15, and clamps a rubber gasket 19 and a screen 20, preferably of perforated metal, to the front end of the tubular member 10. A threaded outlet connection 21 is attached to the free end of reducer 18.

The container 17 is provided with a plurality of apertures 22 near its front end. The closed rear end of the tubular member 10 is formed with inlet apertures 23. Adjustable obstructions may be applied over these apertures so that the passages of water therethru may be regulated. A large headed screw 24 is engaged in the center of the rear end of the container 17. A disc 25 is rotatably mounted on the screw 24, and a co-axial spring 26 acting between the screw head and the disc urges the disc towards the container. The disc 25 is formed with apertures 27 alignable with apertures 23 in one position of the disc. The adjacent ends of the disc 25 and container 17 are formed with circular grooves 28 and a rubber washer 29 is housed therein. The disc 25 may be moved against the action of spring 26, and turned so that the apertures 23, and 27 are not truly aligned. The washer 29 prevents the disc 25 from turning on its own accord.

In the operation of the device, water is fed into tube 12, some of which enters the container 17 thru the apertures 23, 27 and the rest of the water circulates around the container following the lead of the helical spring 16. Some of this water enters the container thru apertures 22, while the rest passes thru the screen 20 and out thru tube 21. The pressure of the water against the rear end of disc 25 forces the container forward so that it is pushed against the screen 20. As the water passes the front end of the container 17, it produces suction within the container, which draws out the water entering into the container thru apertures 23, 27 and 22. The water passing thru the container dissolves the fertilizer which is placed in the container, and this fertilizer solution is diluted with the water passing around the container.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In a device of the class described, the combination with a container having a closed end formed with apertures, and with a circular groove, of a disc with apertures rotatively mounted on a screw projecting from the said closed end, a spring disposed between the head of the screw and the disc for urging the disc against the said closed end, said disc being formed with a circular groove aligning with the said circular groove, and a rubber washer disposed within the grooves for preventing vibrational turning of the disc.

2. A device of the class described comprising a tubular member with front and rear ends, a helical spring therein, a container adapted to hold loose granulated fertilizer and having its front end open and positioned in the spring, the closed end of the container being formed with several apertures and located adjacent the rear end of the tubular member, a screen covering the open end of the container, water inlet connections arranged on the rear end of the tubular member, and water exhaust connections arranged on the front end of the tubular member, whereby water entering through the inlet is divided by the said fertilizer container so as to form an inner stream of water passing through the said loose fertilizer and gradually dissolving the same, thereby producing a concentrated solution, and an outer concentric helically circulating stream of water on the outer side of the said fertilizer container and said concentrated and said circulating streams merged within the said tubular member near the exhaust thereof.

In testimony whereof I have affixed my signature.

OTTO E. LINCK.